(12) United States Patent
Nielsen (10) Patent No.: US 7,418,347 B2
(45) Date of Patent: Aug. 26, 2008

(54) METHOD OF DETERMINING THE RISK OF ICE DEPOSITION DUE TO PRECIPITATION AND APPARATUS FOR EXERCISING THE METHOD

(75) Inventor: Evan Nielsen, Farsø (DK)

(73) Assignee: Dalsgaard Nielsen ApS, Farso (DK)

( * ) Notice: Subject to any disclaimer, the term of this patent is extended or adjusted under 35 U.S.C. 154(b) by 250 days.

(21) Appl. No.: 10/525,795

(22) PCT Filed: Aug. 26, 2003

(86) PCT No.: PCT/DK03/00556

§ 371 (c)(1),
(2), (4) Date: Jun. 8, 2005

(87) PCT Pub. No.: WO2004/018291

PCT Pub. Date: Mar. 4, 2004

(65) Prior Publication Data

US 2005/0251341 A1    Nov. 10, 2005

(30) Foreign Application Priority Data

Aug. 26, 2002  (DK) .............................. 2002 01252

(51) Int. Cl.
*G01W 1/00*  (2006.01)

(52) U.S. Cl. ........................................ 702/3; 73/170.26

(58) Field of Classification Search ..................... 702/3, 702/1, 2; 340/580, 601, 602; 244/134 R; 73/170.26
See application file for complete search history.

(56) References Cited

U.S. PATENT DOCUMENTS

| | | | | |
|---|---|---|---|---|
| 4,320,659 A | * | 3/1982 | Lynnworth et al. | ............ 73/589 |
| 5,096,145 A | * | 3/1992 | Phillips et al. | .......... 244/134 R |
| 5,474,261 A | * | 12/1995 | Stolarczyk et al. | ........ 244/134 F |
| 5,523,959 A | * | 6/1996 | Seegmiller | ................... 340/962 |
| 5,597,140 A | * | 1/1997 | Madsen | ................... 244/134 R |
| 5,708,068 A | * | 1/1998 | Carder et al. | ................. 524/375 |
| 5,744,711 A | * | 4/1998 | Rasmussen et al. | ....... 73/170.21 |
| 5,772,153 A | * | 6/1998 | Abaunza et al. | ........... 244/134 F |
| 5,850,619 A | * | 12/1998 | Rasmussen et al. | ............. 702/3 |

(Continued)

OTHER PUBLICATIONS

Peterson et al., The HALO System- Aplying the 'Safe Wing' Concept to Airline Operations in Ground Icing Conditions, 1995 IEEE, pp. 152-157.*

(Continued)

*Primary Examiner*—Michael P. Nghiem
*Assistant Examiner*—Toan M Le
(74) *Attorney, Agent, or Firm*—Dykema Gossett PLLC (57) ABSTRACT

The invention relates to a method and an apparatus for determining the risk of ice deposition due to precipitation. According to the invention the measurements of precipitation known so far are combined with measurements of the actual amount of ice deposited from the precipitation. Said measurements are combined in a combination unit that is able to receive further parameter information, eg the amount and type of anti-icing liquid. Compared to previously a considerably more reliable determination of the risk of ice deposition is accomplished, eg on the wing of an aeroplane applied with anti-icing liquid, and so is reliable determination of the hold-over time, HOT, during which one can be sure that the aeroplane is free from ice in the current weather conditions.

20 Claims, 6 Drawing Sheets

U.S. PATENT DOCUMENTS

| | | | |
|---|---|---|---|
| 6,751,571 B1 * | 6/2004 | Hallett et al. | 702/130 |
| 6,753,513 B2 * | 6/2004 | Goldberg et al. | 219/497 |
| 6,758,091 B1 * | 7/2004 | Nielsen | 73/170.26 |
| 6,819,265 B2 * | 11/2004 | Jamieson et al. | 340/962 |
| 6,879,168 B2 * | 4/2005 | Baas et al. | 324/671 |
| 7,129,846 B2 * | 10/2006 | Rasmussen et al. | 340/580 |

OTHER PUBLICATIONS

Fotino et al., Ground-Based detection of Aircraft Icing Conditions Using Microwave Radiometers, Nov. 1986, IEEE Transactions on GeoScience and Remote Sensing, vol. GE-24, No. 6, pp. 975-982.*

Sheppard et al., Automated Precipitation Detection and Typing in Winter: A Two-Year Study, 2000 American Meteorological Society, pp. 1493-1507.*

Brown, E. N., Ice Detector Evaluation for Aircraft Hazard Warning and Undercooled Water Content Measurements, Nov. 1982, Journal of Aircraft, vol. 19, No. 11, pp. 980-983.*

Albers et al., The Local Analysis and Prediction System (LAPS): Analysis of Clouds, Precipitation, and Temperature, Sep. 1996, American Meteorological Society, vol. 11, No. 3, pp. 273-287.*

Rasmussen et al., Weather Support to Deicing Decision Making (WSDDM): A Winter Weather Nowcasting System, Apr. 2001, Bulletin of the American Meteorological Society, vol. 82, No. 4, pp. 579-595.*

* cited by examiner

| Lighting | Temperature Range | | Visibility in Snow (Statute Miles) | | |
|---|---|---|---|---|---|
| | °C | °F | Heavy[2] | Moderate[2] | Light[2] |
| Darkness | -1 and above | 30 and above | <2 | 2 - 4 | >4 |
| | Below -1 | Below 30 | <1 | 1 - 2 1/2 | >2 1/2 |
| Daylight | -1 and above | 30 and above | <1 | 1 - 2 | >2 |
| | Below -1 | Below 30 | <1/2 | 1/2 - 1 1/4 | >1 1/4 |

Fig. 1

| OAT | | ISO Type II Fluid Concentration Fluid/Water (Vol%/Vol %) | APPROXIMATE HOLDOVER TIMES ANTICIPATED UNDER VARIOUS WEATHER CONDITIONS (hours: minutes) | | | | | |
|---|---|---|---|---|---|---|---|---|
| °C | °F | | *Frost | Freezing Fog | Snow (including snow grains) | **Freezing Drizzle | Light Freezing Rain | Rain on cold Soaked Wing |
| Above 0 | Above 32 | 100/0 | 12:00 | 0:35-1:30 | 0:20-0:55 | 0:30-0:55 | 0:15-0:30 | 0:05-0:40 |
| | | 75/25 | 6:00 | 0:25-1:00 | 0:15-0:40 | 0:20-0:45 | 0:10-0:25 | 0:05-0:25 |
| | | 50/50 | 4:00 | 0:15-0:30 | 0:05-0:15 | 0:05-0:15 | 0:05-0:10 | |
| 0 to -3 | 32 to 27 | 100/0 | 8:00 | 0:35-1:30 | 0:20-0:45 | 0:30-0:55 | 0:15-0:30 | |
| | | 75/25 | 5:00 | 0:25-1:00 | 0:15-0:30 | 0:20-0:45 | 0:10-0:25 | |
| | | 50/50 | 3:00 | 0:15-0:30 | 0:05-0:15 | 0:05-0:15 | 0:05-0:10 | |
| Below -3 to -14 | Below 27 to 7 | 100/0 | 8:00 | 0:20-1:05 | 0:15-0:35 | ***0:15-0:45 | ***0:10-0:30 | |
| | | 75/25 | 5:00 | 0:20-0:55 | 0:15-0:25 | ***0:15-0:30 | ***0:10-0:20 | |
| Below -14 to -25 | Below 7 to -13 | 100/0 | 8:00 | 0:15-0:20 | 0:15-0:30 | | | |
| Below -25 | Below -13 | 100/0 | ISO Type II fluid may be used below -25°C (-13°F) Provided the freezing point of the fluid is at least 7°C (13°F) below the OAT and the aerodynamic acceptance criteria are met. Consider use of ISO Type I fluid when ISO Type II fluid cannot be used (see table 3) | | | | | |

EXCERPT OF DETAILED HOLDOVER TIMES ANTICIPATED UNDER VARIOUS WEATHER CONDITIONS AS A FUNCTION OF OAT, ISO FLUID TYPE, PRECIPITATION TYPE, ICE CONTENT FACTOR AND EQUIVALENT LIQUID WATER CONTENT.

| PRECIPITATION TYPE | | Freezing Fog | | | Snow & Snow Grains Including Sleet, Hail, Ice Pellets, Ice Crystals | | | | | | | |
|---|---|---|---|---|---|---|---|---|---|---|---|---|
| Ice Factor | | 0 | 1 | 2-9 | 0-1 | 2 | 3 | 4 | 5 | 6 | 7-8-9 |
| OAT °C | ISO Fluid Concentration | Equivalent liquid water mm/hr | < 1 mm | 1 to 2,5 mm | > 2,5 mm | 0,1 to 0,4 mm | 0,4 to 0,8 mm | 0,8 to 1,2 mm | 1,2 to 1,6 mm | 1,6 to 2,0 mm | 2,0 to 2,5 mm | Above 2,5 mm |
| Above 0 | 100/0 | | 1:10-1:30 | 0:50-1:10 | 0:35-0:50 | 0:50-0:55 | 0:45-0:50 | 0:40-0:45 | 0:35-0:40 | 0:30-0:35 | 0:25-0:30 | 0:20-0:25 |
| | 75/25 | | 0:45-1:00 | 0:35-0:45 | 0:25-0:35 | 0:35-0:40 | 0:35-0:40 | 0:30-0:35 | 0:30-0:35 | 0:25-0:30 | 0:20-0:25 | 0:15-0:20 |
| | 50/50 | | 0:25-0:30 | 0:20-0:25 | 0:15-0:20 | 0:10-0:15 | 0:10-0:15 | 0:10-0:15 | 0:05-0:10 | 0:05-0:10 | 0:05-0:10 | 0:05-0:10 |
| 0 to -3 | 100/0 | | 1:10-1:30 | 0:50-1:10 | 0:35-0:50 | 0:45-0:50 | 0:40-0:45 | 0:35-0:40 | 0:30-0:35 | 0:25-0:30 | 0:20-0:25 | 0:20-0:25 |
| | 75/25 | | 0:45-1:00 | 0:35-0:45 | 0:25-0:35 | 0:25-0:30 | 0:25-0:30 | 0:20-0:25 | 0:20-0:25 | 0:15-0:20 | 0:15-0:20 | 0:15-0:20 |
| | 50/50 | | 0:25-0:30 | 0:20-0:25 | 0:15-0:20 | 0:10-0:15 | 0:10-0:15 | 0:10-0:15 | 0:05-0:10 | 0:05-0:10 | 0:05-0:10 | 0:05-0:10 |
| -3 to -14 | 100/0 | | 0:50-1:05 | 0:35-0:50 | 0:20-0:35 | 0:30-0:35 | 0:25-0:30 | 0:25-0:30 | 0:20-0:25 | 0:20-0:25 | 0:15-0:20 | 0:15-0:20 |
| | 75/25 | | 0:40-0:55 | 0:30-0:40 | 0:20-0:30 | 0:20-0:25 | 0:20-0:25 | 0:20-0:25 | 0:15-0:20 | 0:15-0:20 | 0:15-0:20 | 0:15-0:20 |
| -14 to -25 | 100/0 | | 0:15-0:20 | 0:15-0:20 | 0:15-0:20 | 0:25-0:30 | 0:25-0:30 | 0:20-0:25 | 0:20-0:25 | 0:15-0:20 | 0:15-0:20 | 0:15-0:20 |

METHOD OF DETERMINING THE RISK OF ICE DEPOSITION DUE TO PRECIPITATION AND APPARATUS FOR EXERCISING THE METHOD

BACKGROUND OF THE INVENTION

1. Field of the Invention

The invention relates to a method of determining the risk of ice deposition due to precipitation. The invention is particularly, but not exclusively intended for use in connection with determination of the risk of icing in connection with air traffic.

2. The Prior Art

When there is a risk of ice formation, the air traffic uses anti-icing liquids of various types and concentrations, and the problem is to estimate for how long the anti-icing liquid will stay effective during the existing weather conditions. This is referred to as 'holdover time'; in the following designated 'HOT'.

The international airline organisations publish tables that indicate a time interval for holdover time for some anti-icing liquids and for quite a small number of concentrations thereof. These tables, the only tool available at present, are associated with two major factors of uncertainty. Firstly the time intervals listed in the tables are given with large margins, eg a minimum of 30 and a maximum of 60 minutes, and secondly the tables can be used only if it is possible to correctly estimate the precipitation, the tables being divided in accordance with types of precipitation, such as eg snow or super-cooled water. The final responsibility for the estimation lies with the pilot, ie that from within the cockpit, frequently in weather conditions such as following winds and through a heavily heated slanted window, he is to estimate the type of precipitation and then take a stand on the minimum and maximum time intervals given in the table.

The very varying types of precipitation that typically occur within the temperature range of from 5° C. and 8° C. above freezing point are the cause of the longest delays in the airports and often the planes must wait long to obtain permission to take off, while the anti-icing liquid is consumed more quickly or slowly in response to the precipitation conditions.

To date, 141 aircraft accidents have been ascribed to ice accumulation with an ensuing death toll of 1200.

It is the object of the invention to provide a method that enables determination of HOT, wherein the determination is based on actual measurements rather than the subjective estimations resorted to so far in the prior art.

SUMMARY OF THE INVENTION

This object is accomplished by a method wherein air temperature and the actual amount of ice in the precipitation are measured and combined to determine the risk of ice deposition. As it is, a determination of the type of precipitation or the equivalent amount of liquid cannot be taken to express how much ice will be formed, since—by the known methods—it is not possible to distinguish between super-cooled water and ordinary water. This uncertainty is the greatest precisely within the temperature range where the risk of icing is the largest, viz around 0° C.

By combining the measurements in accordance with the invention, a complete and objective measurement is accomplished of the conditions that are significant to the estimation of the risk of ice formation when anti-icing liquid is used. The combination and its significance are explained in further detail in the context of FIGS. 2 and 3.

The two measurements that are combined according to the invention can each be obtained separately by techniques that are already known and that can be performed by use of separate apparatuses or by means of a combined apparatus. For instance, the equivalent amount of liquid can be determined by means of the technique taught in U.S. Pat. No. 5,434,778.

In accordance with a preferred embodiment the actual content of ice in the precipitation is determined by means of a measurement of the actual ice formation, e.g., by means of the technique taught in WO 00/54078.

In accordance with one embodiment the temperature of the surface element is caused to be essentially the temperature of atmospheric air, but alternatively the temperature of the surface element can be controlled to have another predetermined temperature. In this context, parameters such as the temperature of the fuel in the wing or that of the sprayed-on anti-icing liquid may be of relevance.

By the apparatus taught in WO 00/54078, a number of surface elements are rotated at a rate that is to ensure, on the one hand, that the ice is deposited and, on the other, that the majority of water drops are flung off. By exercising the method, it is ensured that the slow rotation does not reduce the actual ice formation, and the high rate of rotation ensures that no water remains on the rotor before the amount of ice deposited is weighed. The amount of ice can also be determined in other ways than weighing.

Moreover, it is expedient to perform further measurements.

By combining the reliable measurement of the risk of ice formation with knowledge of the type and concentration of the applied anti-icing liquid it is possible to achieve a more reliable estimate of the holdover time, HOT, to be expected for keeping the fly wings free from ice in the given weather conditions. By the invention it is enabled that HOT can be given with a very reduced margin of insecurity compared to the prior art, see the explanation in the context of FIGS. 2 and 3.

However, it often applies—in particular within the field of air traffic—that a rather conservative approach is employed which will undoubtedly involve that some time will elapse before the pilots get used to having access to a well-defined holdover time. Undoubtedly, the well-known tables will be consulted for some time yet, of which one of the elements of insecurity was to determine the type of precipitation. By exercising the invention, the objective determination that results from the invention can be used to give a reliable indication of the actual composition of the precipitation.

Then the pilots can feel safe in, initially, verifying that the holdover time according to the invention is within the maximum intervals given in the tables and, subsequently, in complete confidence use the holdover time according to the invention as a reliable, well-defined limit.

Safety being, of course, the top priority; there remains also the aspect that the anti-icing liquid is expensive and that it is waste of money and associated with unnecessary pollution to apply more anti-icing liquid than needed to obtain safe flying. By exercising the invention it is possible to determine the smallest requisite concentration of the anti-icing liquid to be applied to accomplish a desired holdover time.

Apart from the above advantages, the invention provides options that present completely new perspectives. By combining measurement equipment for determining the amount of precipitation and combinations with measurement equipment for measuring the amount of ice actually deposited, it is now an option to make a self-learning expert system. According to the invention a holdover time is accomplished that is far more reliable than the one used so far, based on measurements, though, of actual weather conditions that applied five or ten minutes ago at most. The known tables are based on empirical conditions that can be registered in a calculation mode with some parameters being automatically adjustable by comparison of the calculated deposited amount of ice of the calculation model to the amount of ice actually measured. Thereby, the risk of ice can be duly predicted. By connecting computers in various airports to each other, and by inputting meteorological data the model can be expanded to provide, based on meteorological data, an estimate of the risk of ice at other airports, and this estimate can be compared to the currently measured ice accumulation at these airports, following which a calculation model can be dynamically optimised.

The invention also relates to an apparatus for exercising the method.

Preferably the apparatus also contains a data storage with empirical information on holdover time so as to provide a considerably more reliable determination of the actual holdover time.

The apparatus may also feature a computer with a mathematical model for estimating e.g., holdover time, wherein the model comprises a number of adjustable parameters. By comparing the estimated results to the ones actually measured, the parameters can be adjusted, whereby a self-learning expert model can be accomplished.

The invention will now be explained in further detail by the description that follows, reference being made to the drawings.

BRIEF DESCRIPTION OF THE PREFERRED EMBODIMENTS

FIG. 1 shows a known table used in particular in Canada;

FIG. 2 shows a further known table as used in Europe;

FIG. 8 shows the way in which the embodiment shown in FIG. 7 works; while

DETAILED DESCRIPTION OF THE PREFERRED EMBODIMENT

FIG. 1 shows a table, Transport Canada, June 2002, used for estimation of HOT. The table is used "rearwards", ie the pilot estimates visibility in statute miles (the numbers given in the twelve cells). When the visibility in snow is to be estimated it is of significance whether it is light or dark and moreover temperature plays a part as well. The table is used for estimating whether the snowfall is 'heavy', 'moderate' or 'light'. Then another table is used (not shown) that indicates intervals for the equivalent amount of water in the precipitation as a function of 'heavy/moderate/light', and once that is found it is possible to resort to a further table (not shown) for obtaining a time interval for HOT as a function of the equivalent amount of water.

The method taught in the context of FIG. 1 is thus based on an estimate, ia of the visibility and how light or dark it is.

On 29 Jul. 2002 the National Center of Atmospheric Research published an article that explains the scientific reasons why visibility is unsuitable for use as decisive parameter as taught in connection with FIG. 1. It follows that this estimate is fairly uncertain.

FIG. 2 shows another known table indicating HOT time intervals if one is able to categorize the type of precipitation as one of the six types of precipitation shown in FIG. 2. The table can be used for various temperature intervals and for three different mixing ratios for anti-icing liquid.

Figure 3:
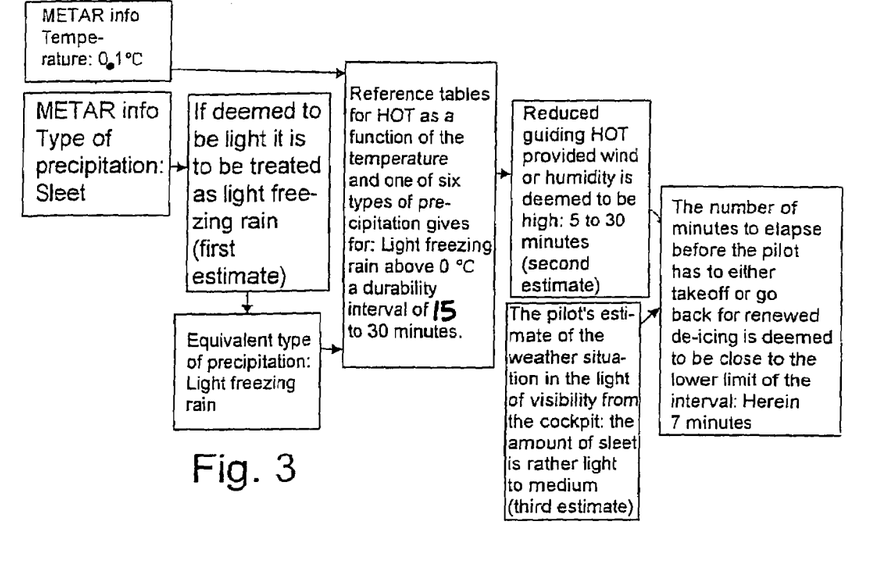
FIG. 3 illustrates how HOT is estimated by the prior art.

FIG. 3 illustrates the method when the table shown in FIG. 2 is used. FIG. 3 is made to be, in principle, self-explanatory and hence only few comments will be made to FIG. 3. Particular attention is drawn to the fact that in FIG. 3 three estimates are made. In connection with information on the current weather being distributed every half hour (METAR), it is necessary, in case of sleet, to estimate whether it is light or heavy sleet. Then this first estimate is converted to an equivalent type of precipitation, being in the example light freezing rain. Use of the table as it is gives a holdover interval of 15-30 minutes (corresponding to FIG. 2, top line under the column headed 'light freezing rain'). The upper limit of the time interval is thus given to be twice the lower limit, which is not reassuring. Besides the pilot has to perform the estimate that HOT is to be reduced if the velocity of air or humidity of air is deemed to be high and, finally, the pilot has to estimate how the precipitation may change, if at all.

In practice this means that a pilot who drives for take off, typically in following wind conditions and with heavily slanted and heated window panes, is to be able to determine what the precipitation consists of (water, snow, sleet, supercooled water, etc). In these conditions the pilot must later queue up for permission to take off and as time goes by perform an estimate whether the anti-icing liquid is still effective, having at his disposal only the very large margins of insecurity shown in FIG. 2; in adverse conditions the HOT may be as small as seven minutes. Therefore accidents will occur when the table may indicate HOT to be as much as 30 minutes.

The known measurement equipment for measuring the composition of the precipitation is able to measure drop size and estimate the distribution between snow and water, temperatures, dew point, etc., but is unable to distinguish whether a water drop is super-cooled or not, which is crucial in the estimation of the risk of ice formation.

Figure 4:
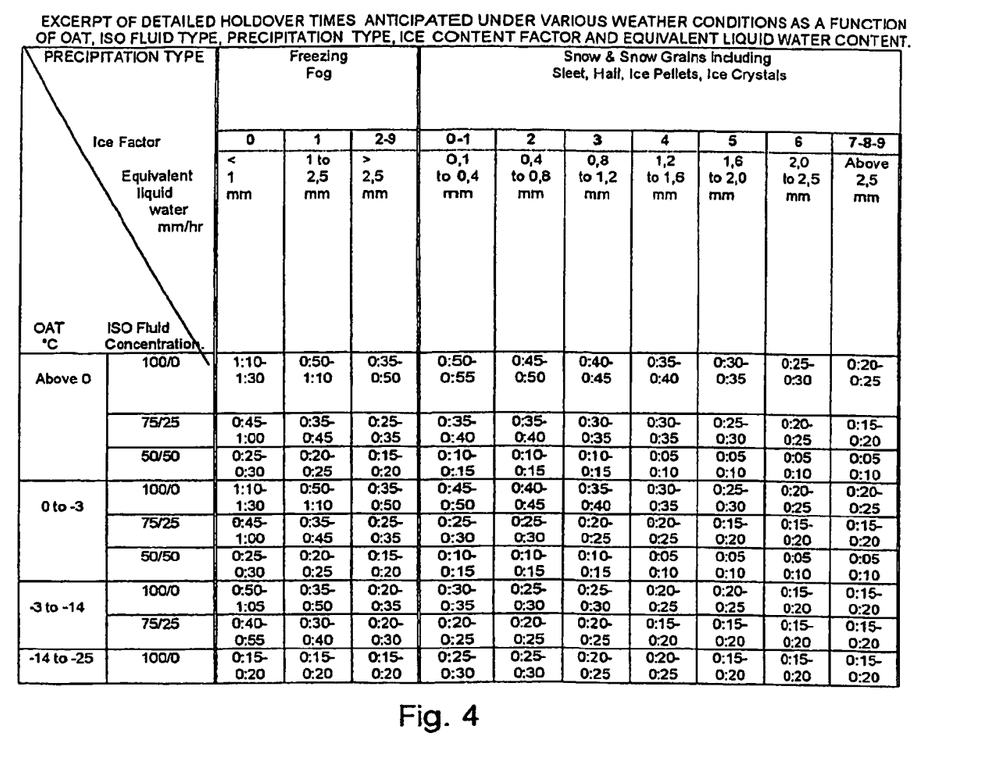
FIG. 4 shows how, according to the invention, time intervals can be given with great accuracy.

Reference is now made to FIG. 4 that shows a table like the one shown in FIG. 2, wherein, however, new measurement parameters are introduced, viz ice factor and equivalent water amount.

It goes without saying that the equivalent amount of water in the precipitation—in combination with the temperature to the left in the table—is very significant to the amount of anti-icing liquid consumed during a given period of time. Therefore it may be obvious to a person skilled in the art to introduce the equivalent liquid amount into the table and receive information thereon through METAAR every half hour. This time interval is too large, but obviously it is an option to transmit the equivalent liquid amount more often when there is a risk of ice accumulation. However, the other issue is greater, and that is due to the fact that the measurement methods used so far for finding the equivalent water amount has been associated with an inaccuracy of about 30% around 0° C., where the problems solved by the invention are the greatest. The measurement methods known so far have been unable to distinguish between how large a part of the deposited liquid drops are super-cooled and how large a part is not. According to the invention a measurement of the actual amount of latent ice content in the precipitation is measure, which is indicated by the numerals 1-9 in FIG. 4. The dimension for the ice factor is the weight of deposited ice per surface unit per time unit.

By combining ice factor and equivalent amount of water in accordance with the invention it is now possible in a reliable manner to provide far more accurate times/intervals for HOT, as will appear from FIG. 4, compared to what could be obtained by the prior art according to FIG. 2.

If for instance, the table is consulted under heading 'snow' and it is assumed that the ice factor is 2 and the equivalent water amount is between 0.4 and 0.88 mm it is possible to have fairly accurate information on the number of minutes for HOT. However, it is often the case that the actual risk of ice formation (eg at ice factor 2) does not always correlate with the equivalent water amount given in the table, viz 0.4 through 0.8. For instance, it is perceivable that the ice factor is measured to be 5, although the equivalent water amount is measured to be within the range of from 0.4 to 0.8. This is due to the fact that almost all of the precipitation is super-cooled water, and therefore it is an option of one embodiment to select to enter the table under ice factor 5 and disregard the equivalent amount of water that was 0.4-0.8.

Alternatively the ice factor could be measured to be 1, the equivalent water amount being, however, measured to be 0.4-0.8. Albeit the risk of is formation is in this case comparatively lower, there still remains an amount of precipitation, eg snow under 0° C., that would consume a larger amount of anti-icing liquid than would be the case with an ice factor of 1. According to one embodiment the worst possible one of the ice factor measurements or of the equivalent water amount measurement is selected as starting point for the calculation of HOT.

The embodiment just described for combination of ice factor and equivalent water amount is a simplified form of utilising the invention. On the basis of the explanations given above, it will be understood that, on the basis of tests, calculations and empirical tables, it will be possible to weight the ice factor and the significance of the equivalent water amount, thereby ensuring that a sufficient amount of anti-icing liquid is applied, while simultaneously use of redundant amounts of anti-icing liquid is avoided.

Table 4 includes some representative minute indicators for HOT. Such values are not merely conditioned by calculations on the basis of said measurements, but also on the safety requirements made by the air traffic authorities.

It is noted that, in accordance with the invention, it is no longer necessary to read out a type of precipitation, and as such distinguish between the various types of precipitation, since the invention enables a fairly accurate value for HOT. The reason why the types of precipitation are still included in FIG. 4 is the conservatism that will be discussed at a later point in the specification, and that the types of precipitation can now be determined even more accurately by means of the invention (which also correlates with the fact that HOT can be determined more accurately according to the invention).

Figure 5:
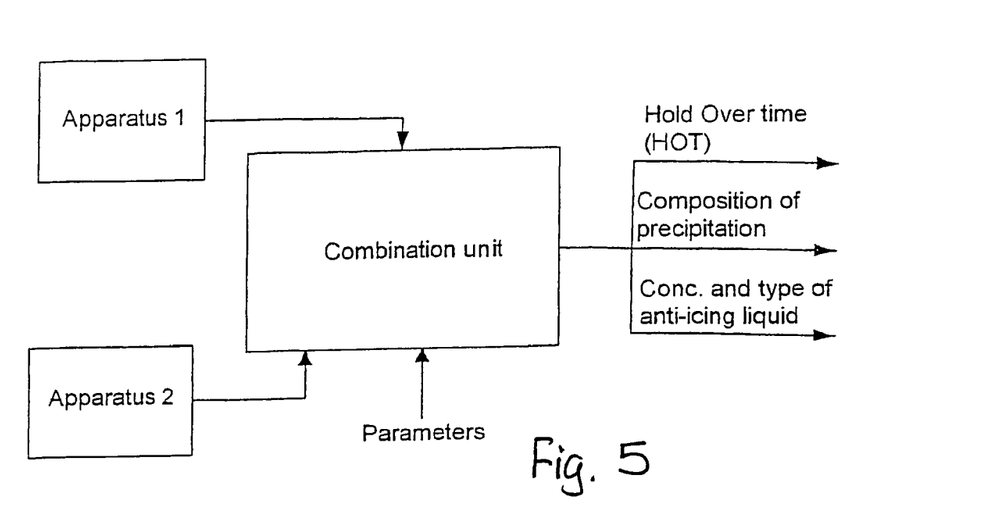
FIG. 5 schematically shows the principle of the invention.

FIG. 5 is a schematic view of an apparatus 1 known per se for measurement of the density of liquid and frozen particles contained in the precipitation and an apparatus 2 for measurement of the actual amount of ice deposited by the precipitation. According to the invention, these measurement results are combined in a calculator unit that is able to produce various output signals such as holdover time, HOT, composition of the precipitation and concentration of anti-icing liquid. The calculator unit receives other parameter values, too, such as empirical values for HOT in response to the composition of precipitation, types of concentration of anti-icing liquid, etc.

As described above, the apparatus for measuring the actual amount of ice in the precipitation could be determined eg by means of the apparatus known from WO 00/540078 that is able to provide an exact result of how much is accumulated on a standard surface element erected on the airport premises. Thereby it can be determined how much of the liquid precipitation is super-cooled, but it cannot be deduced there from how quickly the anti-icing liquid will be consumed since the consumption depends on the type of precipitation, see the table shown in FIG. 2. Taking one's starting point in the empirical tables of holdover time that are based on type of precipitation and combining that with an apparatus for measuring the actual ice formation, it is now possible to determine the type of precipitation with great reliability and therefore the large margins of insecurity of the known tables can be narrowed and in many cases replaced by a certain number of minutes for HOT when the type of concentration of the anti-icing liquid is also entered as a parameter in the calculator unit shown in FIG. 3.

It is known that a certain degree of conservatism prevails within the aviation industry and it is therefore to be expected that a large number of pilots would prefer to compare the objective and accurate holdover time according to the invention to the teachings of the 'old' tables. As mentioned and as taught by the invention an exact definition of the type of precipitation is also accomplished and this can also be read out to the pilot who is thereby able able to refer to the 'old' tables.

The very high degree of uncertainty that has so far been associated with the prevention of accidents due to ice deposition has, of course, entailed an excess consumption of anti-icing liquid which is both very expensive and also a pollutant. By means of the accurate results accomplished by the invention it is also possible to calculate 'backwards', ie if as a starting parameter it is informed to the calculator unit that one needs a holdover time of eg 35 minutes, the calculator unit is able to produce an output signal that defines the type and concentration of anti-icing liquid. FIG. 5 will show a fairly detailed example of the calculation of the requisite type of anti-icing mixture, while simultaneously FIG. 5 illustrates how the results from apparatus 1 and apparatus 2 are combined.

FIG. 5 explains which measurements are typically obtained by apparatus 1 shown in FIG. 1. These measurements alone are associated with the drawback that it is not possible to distinguish between rain and super-cooled rain, but by combining the measurements from apparatus 1 with measurements from an apparatus 2 in accordance with the invention, it is possible to determine the actual amount of ice accumulated, whereby a far more reliable estimate of HOT is accomplished compared to what was possible with the prior art. It should be noted that the designations 'apparatus 1' and 'apparatus 2' need not necessarily be two physically different apparatuses; rather they express the measurement principles applied and explained in cells 11 and 12, respectively, in FIG. 5. It also applies that in case of physical movement apparatus 2 is unable to distinguish between heavy precipitation of very fine snow with small adhesive capability and light precipitation in the form of wet snow with correspondingly large adhesive capabilities; this difference, however, can easily be determined by apparatus 1 on the basis of the difference in reflectivity. The two measurement principles 1 and 2 therefore supplement each other in a particularly advantageous manner for achieving a reliable determination of the type of precipitation, see cell 13. According to a preferred embodiment, the measurements in apparatus 2 are performed at different rates of rotation for the measurement element in order to further enhance measurement reliability. As it is, an immediate combination of the measurements made by apparatuses 1 and 2 in case of a typical movement of the measurement element does not enable distinction between sleet (water/snow) and other water and ice-particle mixtures (eg water/hail). This distinction can be obtained by performing measurements in apparatus 2 at a number of different rates of rotation, whereby the different whirl-off characteristics of various ice particles and water can be taken into account. The latter measurements are illustrated in cell 14, such that in cell 15 an even more reliable determination is obtained of the nature of the precipitation. This was what was the major problem of the prior art when eg the table shown in FIG. 2 was to be used. When the reliable determination of type of precipitation is combined with the experience numbers shown in cells 16 and 17 it is possible to obtain a very reliable determination of HOT in cell 18. This very reliable determination makes it possible in practice, too, to "calculate rearwards", ie when the very accurate HOT is known in cell 18, it is possible by combination with the desired durability (cell 19) to deduce that if it is desired to have a durability of 12 minutes an anti-icing liquid should be in a mixture ratio of 88% of anti-icing liquid and 12% of water, see cell 20.

It is noted that the values given in connection with the figures serve as examples only, as a complete set of values is very comprehensive and in practice something that is defined in cooperation with the air traffic authorities.

Figure 6:
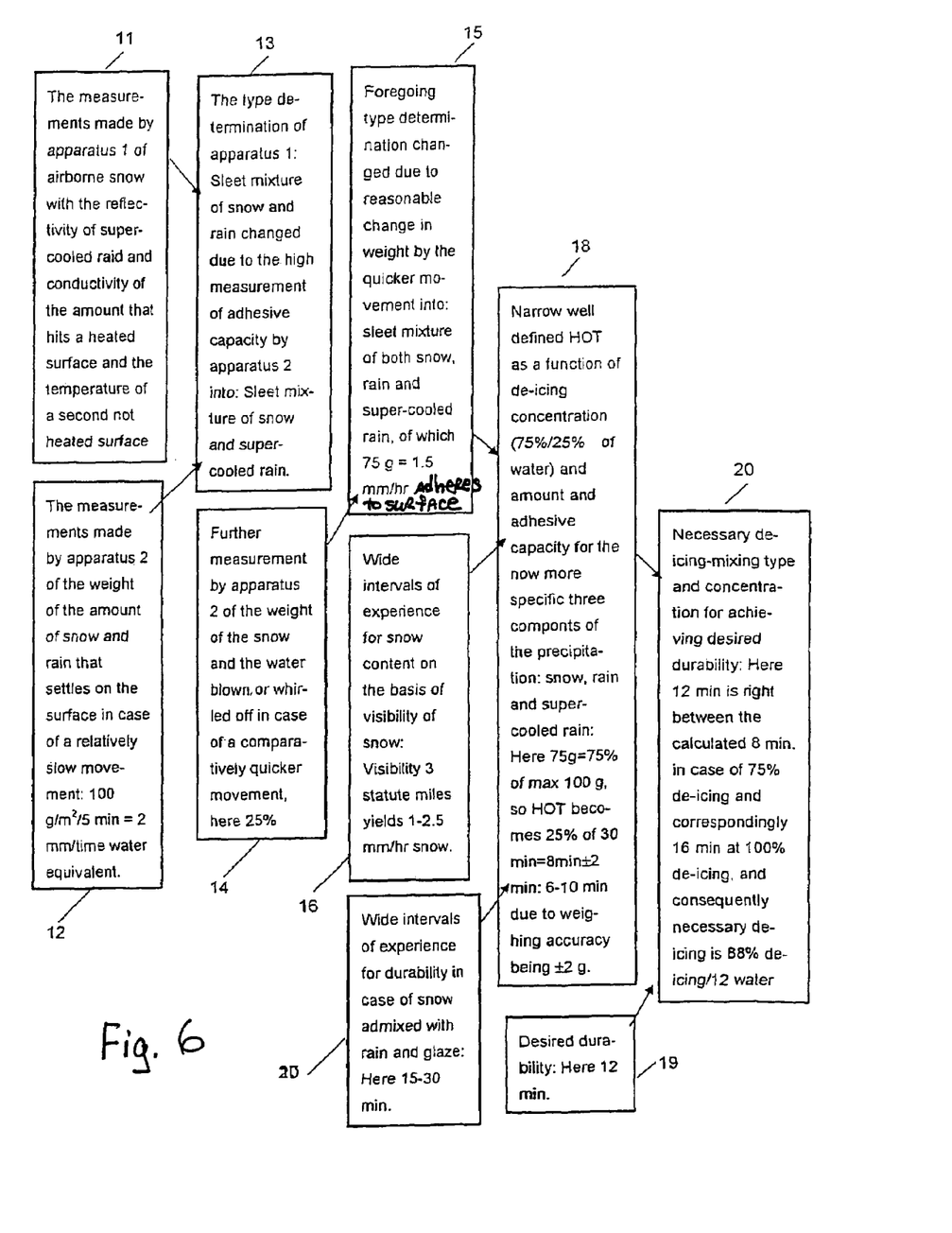
FIG. 6 shows an example of the functioning of the calculation unit shown in FIG. 5.

FIG. 6 shows some further advantages of the invention. The calculator unit mentioned in FIG. 3 is now a constituent of a larger computer that comprises a mathematical model for estimating an expected result. The expected result was compared in the computer to subsequent actual measurements of the actual amount of ice formed and in case of a deviation an adjustment is automatically performed of the parameters of the mathematical model that will, in this manner, become a self-learning expert model. The prerequisite for this to be accomplished is precisely the combination according to the invention: viz that a number of reliable measurement results are provided that are entered into the model and that exact knowledge is provided about the 'true' result used for performing automatic adjustments of the mathematical model. It will be understood that the apparatus for measurement of the actual amount of ice can be elaborated on in a variety of ways. For instance it is possible to perform particular procedures on various sequences of rotation and temperature in the apparatus and subsequent measurement of accumulated amount of ice, ice structure, measurement of air resistance, density of the ice, and it is also an option to spray the surface element with anti-icing liquid. In practice, not all of such measurements can be performed immediately before each and every plane is due for application of anti-icing liquid, when the traffic is dense, but these measurements can, when traffic is less dense, contribute to optimisation of the mathematical model, thereby considerably increasing the reliability of the rather short-termed measurements that are performed immediately before anti-icing liquid is applied to a plane.

Figure 7:
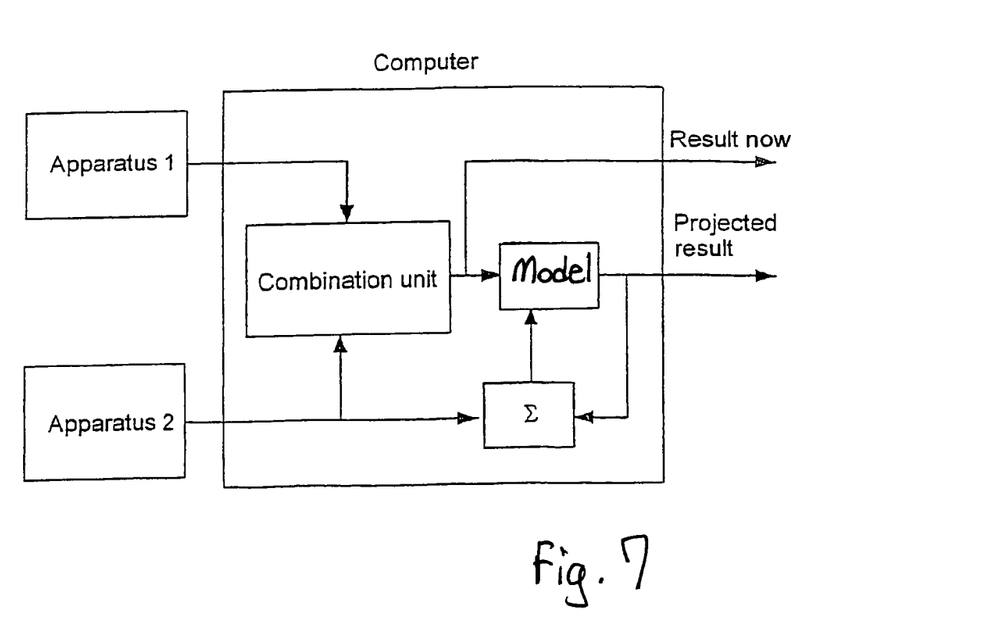
FIG. 7 shows an embodiment of the invention combined with an expert system.

FIG. 7 illustrates how the invention can be used in combination with an expert system. The functions in cells 21-24 are immediately recognizable in view of the above explanations. Thus cell 25 contains the results that can be achieved by means of the combination unit shown in FIG. 4 as was explained in the context of FIG. 5. Cell 26 contains information on the one hand on the most recently calculated result and previously calculated results and when this is compared to the absolutely most recent result the parameters of an expert model can be optimized such that both yet more well-defined results are obtained in cell 27 and the option is provided of projecting a result eg 20 minutes ahead in time, see cell 28.

Figure 8:
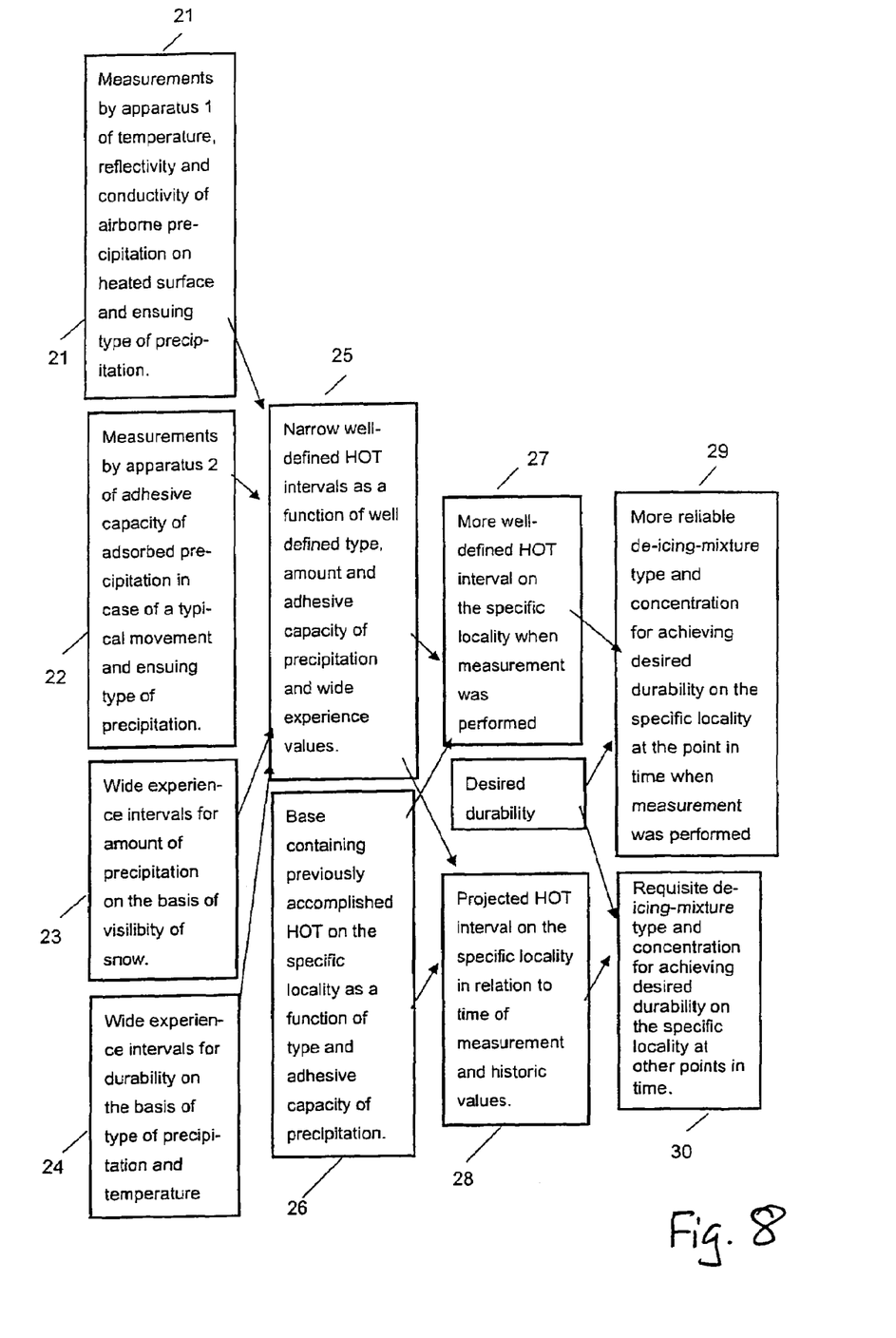
Figure 9:
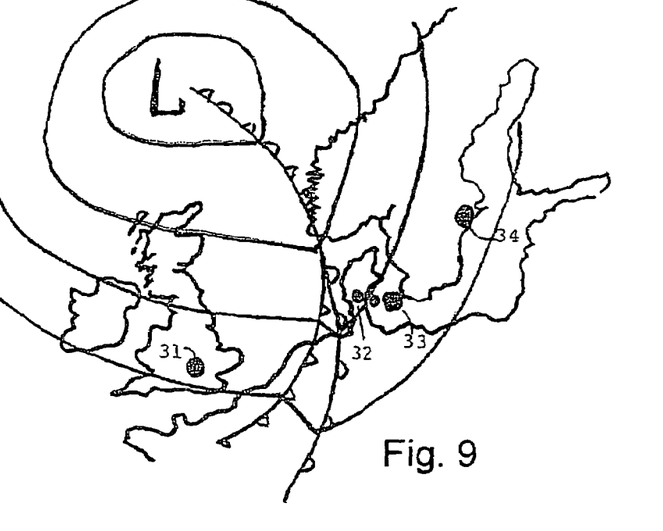
FIG. 9 shows how the invention can be combined with meteorological information for predicting the risk of ice, distributed over large distances and periods of time.

In principle, FIG. 8 shows how a global network of information relating to the risk of icing can be built. According to the invention the calculations can be supplemented with meteorological information. FIG. 8 schematically shows fronts of depressions on their way across the North sea and the computer in one of London's airports 31 now containing exact knowledge of the risk of icing and how it was distributed during passage of the fronts. This information and the meteorological information can be used first in Billund 32 and then in Copenhagen 33 where the adjustments that subsequently appear at the passage of the front can be used at the airport in Stockholm 34 when the fronts pass.

The described considerable improvements in air-traffic safety could not have been obtained by means of a known expert system in combination with the empirical and very uncertain determinations of the risk of icing known so far. The high degree of inaccuracy achieved by the invention enables use of advanced calculation models to impart reliable valued at the individual airports and such that the reliability can be further enhanced by means of measurements performed in other airports.

The invention claimed is:

1. A method of determining risk of ice deposition from air due to precipitation comprising the steps of measuring the air temperature, estimating a type of precipitation and an amount of precipitation, rotating a surface element having a surface with a predetermined area through the air for a predetermined period of time, measuring an actual amount of ice accumulated on the surface element, and combining the measurements to determine the risk of ice deposition.

2. A method according to claim 1, wherein the type of precipitation is estimated on the basis of a measurement for determining the ratio of liquid to frozen particles contained in the precipitation.

3. A method according to claim 1, wherein a measurement is performed for determining the total equivalent, liquid amount of precipitation.

4. A method according to claim 1, wherein the measurement for determining the actual amount of ice contained in the precipitation is performed as a calculation on the basis of dew point measurement.

5. A method according to claim 1, wherein at the temperature of the surface element is caused to correspond essentially to the temperature of the atmosphere.

6. A method according to claim 1, wherein the temperature of the surface is caused to have another predetermined temperature during said period of time.

7. A method according to claim 6 following measurement of the accumulated amount of ice, a relative movement is briefly provided between the surface element and the atmosphere at a relative rate that considerably exceeds the rate prior to said measurement, following which a further measurement of deposited ice is performed.

8. A method according to claim 7, comprising controlling the relative rate between the surface element and the atmosphere by controlling the rate of rotation of one or more rotatable surface elements.

9. A method according to claim 8, comprising measuring adhesive capacity of the ice by measurement of the accumulated amount of ice following a number of rotations at mutually different rates.

10. A method according to claim 8, comprising measuring resistance between the air and the ice accumulated on the surface element.

11. A method according to claim 10, comprising applying an anti-icing liquid in a predetermined concentration and a predetermined amount on the surface element before the measurements are performed.

12. A method according to claim 11, and wherein a surface is applied with a predetermined type and concentration of anti-icing liquid, wherein the risk of ice deposition on the surface is calculated on the basis of knowledge of the type and concentration of the anti-icing liquid; knowledge of the result of the measurement for determining the ratio of liquid to solid particles contained in the precipitation; and knowledge of the result of the measurement for determining the current amount of ice contained in the precipitation.

13. A method according to claim 12, wherein the risk is calculated and shown as a holdover time.

14. A method according to claim 12, wherein manual tables are used to estimate holdover time, wherein the tables are grouped according to different types of precipitation, wherein the knowledge of the current amount of ice contained in the precipitation and the ratio of the precipitation of solid to liquid particles is used for defining the type of precipitation.

15. A method according to claim 12, wherein the concentration and anti-icing liquid is determined as a function of holdover time and the measured risk of ice deposition.

16. A method according to claim 15, wherein an expert system is used for the calculations which is configured for being run on a computer and configured for being able to estimate the risk of ice deposition on the basis of measurements, and configured for receiving information about the actual amount of ice accumulated, and, on the basis of the difference between the calculated and actual amount of ice, adjusting parameters in a calculation model for calculating the deposited amount of ice.

17. A method according to claim 16, wherein the computer is caused to be in communicative connection with other computers that are located in geographical different places; and that the expert system is configured for calculating in advance future changes with regard to the risk of ice deposition in response to meteorological parameters entered therein.

18. An apparatus for determining a risk of ice deposition from air due to precipitation which comprises a combination of optical means for measuring reflectivity of precipitation, mechanical means for rotating a measuring surface element in relation to the air and for measuring an amount of ice accumulated on the surface element during a given period of time, and electronic means for combining said measurements.

19. An apparatus according to claim 18 and for the calculation of holdover time for anti-icing liquid, comprising a data storage device for storing information about empirical values for holdover time as a function of type of precipitation and the concentration of the anti-icing liquid.

20. An apparatus according to claim 18, comprising a mathematical model for estimating the ice deposition due to precipitation; and that the electronic means are configured for comparing the estimated values to the actually measured values for the amount of ice and for adjusting parameters in the model for optimisation thereof.

* * * * *